UNITED STATES PATENT OFFICE.

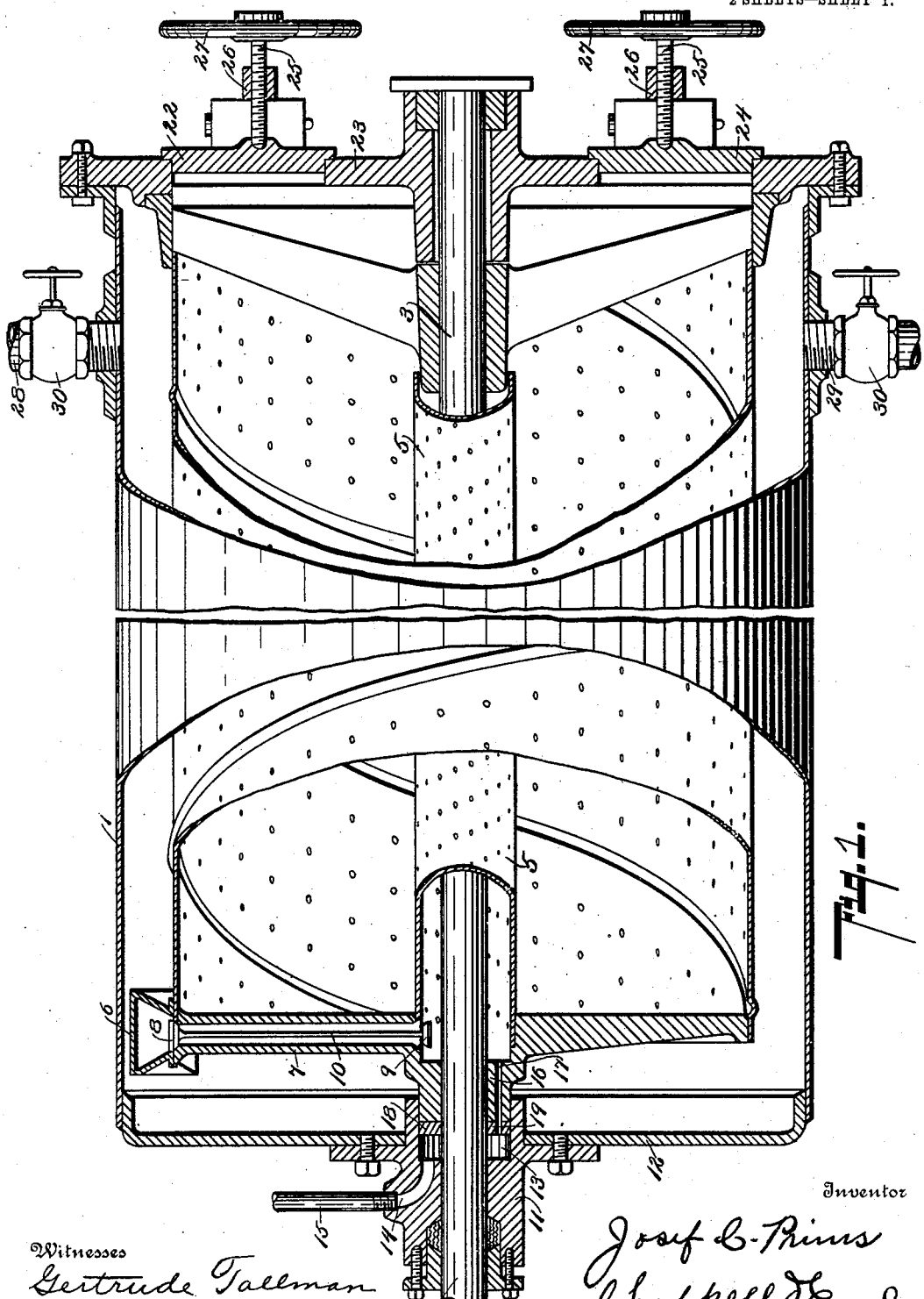

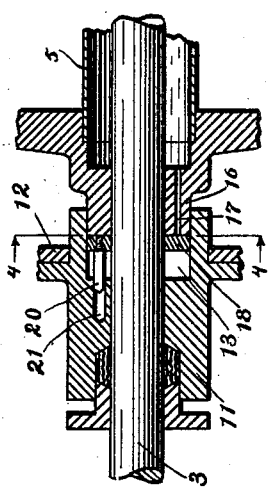
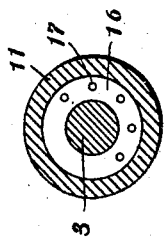
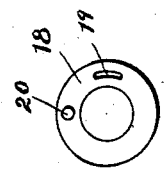
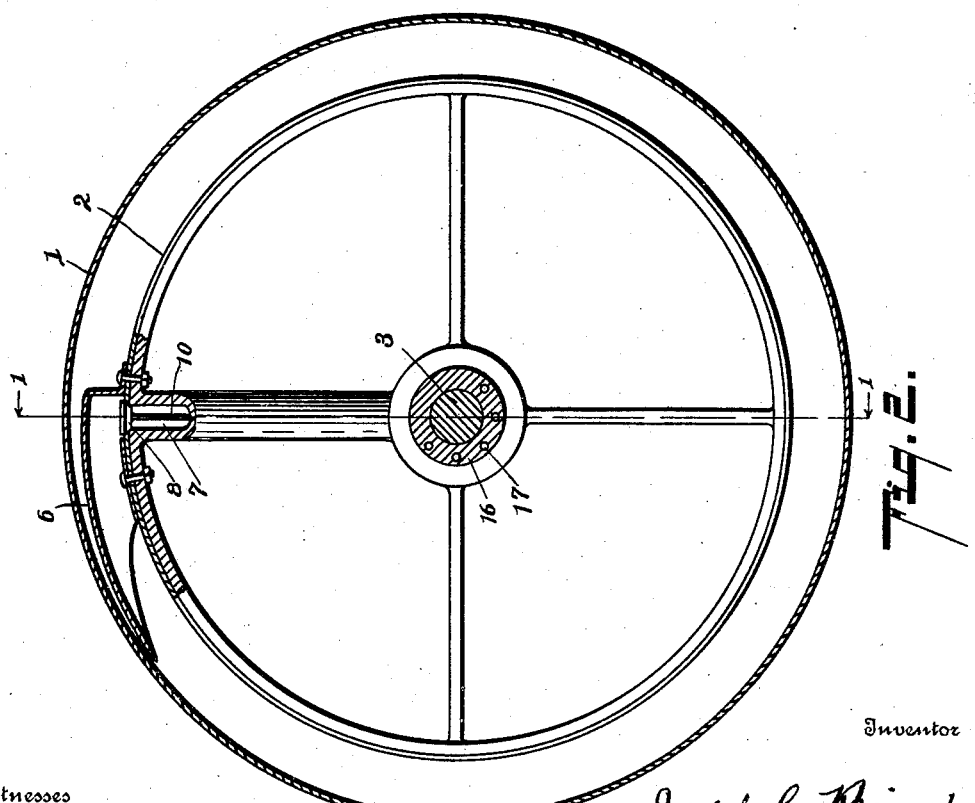

JOSEF C. PRIMS, OF BATTLE CREEK, MICHIGAN, ASSIGNOR TO THE J. C. PRIMS MACHINERY COMPANY, OF BATTLE CREEK, MICHIGAN.

COOKER.

No. 928,795.  Specification of Letters Patent.  Patented July 20, 1909.

Application filed August 4, 1908, Serial No. 446,940. Renewed June 3, 1909. Serial No. 499,997.

*To all whom it may concern:*

Be it known that I, JOSEF C. PRIMS, a citizen of the United States, residing at the city of Battle Creek, county of Calhoun, State of Michigan, have invented certain new and useful Improvements in Cookers, of which the following is a specification.

This invention relates to improvements in cookers.

My invention is particularly applicable to cookers for use in cooking grain for the manufacture of breakfast foods and the like, although it is very desirable for use in cooking grains for any purpose.

The main objects of this invention are: First, to provide an improved cooker by which grain may be thoroughly and evenly cooked and uniformly flavored or seasoned during the cooking process. Second, to provide an improved cooker by which grain may be cooked by steam, and at the same time, be thoroughly moistened with its own liquor or with any desired solution. Third, to provide an improved cooker which is capable of very rapid work—that is, one which cooks rapidly and evenly.

Further objects, and objects relating to structural details, will definitely appear from the detailed description to follow.

I accomplish the objects of my invention by the devices and means described in the following specification.

The invention is clearly defined and pointed out in the claims.

A structure embodying the features of my invention is clearly illustrated in the accompanying drawing, forming a part of this specification, in which,—

Figure 1 is a detail view, partially in longitudinal section, taken on a line corresponding to line 1—1 of Fig. 3, of a structure embodying the features of my invention. Fig. 2 is a vertical section, taken on a line corresponding to line 2—2 of Fig. 1. Fig. 3 is a detail longitudinal section showing the details of the steam inlet valve. Fig. 4 is a cross section taken on a line corresponding to line 4—4 of Fig. 3. Fig. 5 is a side elevation of the steam inlet valve.

In the drawing, similar reference numerals refer to similar parts throughout the several views, and the sectional views are taken looking in the direction of the little arrows at the ends of the section lines.

Referring to the drawing, the cooking retort 1 is preferably cylindrical in form and is mounted on a suitable support, the details of which are not here illustrated. Within the retort is a container or grain receptacle 2, which is also preferably cylindrical in form. The walls of this container 2 are perforated for the passage of liquid and steam. The container is mounted to revolve with the shaft 3 so that the grain contained within the cooking receptacle or container is agitated by the revolution thereof. The container is preferably provided with spiral corrugations 4, which compensate for the expansion of the metal caused by the heating and cooling of the retort.

Arranged through the container or grain receptacle is a conduit 5, which is also provided with perforations for the delivery of the liquid and steam. This conduit is preferably located about and incloses the shaft 3. Mounted upon the container is a scoop 6, which is connected by the passages 7 to the conduit 5. This scoop is adapted to dip up liquid as the container is revolved and deliver it through the passage 7 to the conduit 5. The passage 7 is provided with an inlet valve 8 and a discharge valve 9, these valves being connected by the stem 10, so that, as one valve is opened, the other is closed. The grain to be treated is introduced through the door or closure 22, which is preferably rabbeted to seat in a suitable opening in the head 23 and secured by means of the screw 25 which is threaded through the arm 26, the screw being provided with a suitable hand wheel, as 27, for its manipulation. The material is discharged through the door 24, which is preferably provided with a securing means, such as described for the door 22. Inlet and discharge pipes 28 and 29, respectively, are provided for the retort 1, and valves, as 30, are provided therefor. The pipe 29 may be used to drain off the solution or liquid from the receptacle 1, while the pipe 28 may be used to introduce the liquid, or it may be introduced through the charge door 22, as desired. The valve 30, in operation, is used to control the steam in the chamber. These valves are of sufficient weight so that they close by gravity, which opens the inlet valve 8 when the scoop is in its dipping position, and closes it when the passage 7 is in its discharging position, the valve 9 then being open. This prevents the delivery of steam through the passage 7. The scoop, as the grain receptacle is revolved, dips up the liquid which may be seasoned or flavored as desired, and delivers it into the conduit, so that it is passed through the grain, thereby keeping up a circulation of the liquid through the grain.

The steam is preferably delivered to the conduit through the bearing 11 for the shaft 3, this bearing being preferably mounted on the head 12 of the cooking retort 1. In the bearing is a valve chamber 13 into which the delivery passage 14 opens, the passage 14 being connected by a pipe, as 15, to a suitable source of steam supply.

The grain receptacle 2 is provided with a hub 16, which projects into the valve chamber and has a passage, or passages, 17 therein, opening into the conduit 5.

I preferably provide a plurality of these passages, as illustrated. The valve 18 is preferably in the form of a disk, having an elongated port 19 therein adapted to be brought into register with the passages 17 as the container revolves, thus admitting steam intermittently. The passages 17 are so located as to be opened when the discharge valve 9 for the passage 7 is opened, the object being to admit steam at this time to assist in circulating the liquid through the conduit 5.

The valve 18 is preferably arranged about the shaft 3, to bear against the end of the hub 16, and is prevented from rotating by means of a pin 20, which engages a hole 21 provided therefor in the bearing, thus forming a simple and effective automatic valve for the steam.

By my improved cooker I am enabled to steam cook the grain and to flavor it at the same time, or the grain may be kept properly moistened with its own liquid during the cooking process.

I have illustrated and described my invention in detail in the form preferred by me on account of the structural simplicity and economy and convenience in operation. I am, however, aware that it is capable of very great variation in structural details without departing from my invention, and I wish to be understood as claiming the same broadly, as well as specifically, as illustrated.

Having thus described my invention, what I claim as new and desire to secure by Letters Patent is:

1. The combination with a cooking retort, of a cylindrical container having foraminated walls, arranged therein; a shaft; a foraminated conduit arranged centrally of said container about said shaft; a scoop carried by said container; a connecting passage therefor to said conduit; valves arranged at each end of said passage; connections for said valves whereby they are adapted to alternately open and close as the container is revolved; a bearing for said shaft arranged through the wall of said retort, said bearing having a steam inlet passage and a valve chamber therein; a hub for said container projecting into said valve chamber, said hub having a steam passage therein arranged to deliver to said conduit; and a steam inlet valve arranged in said valve chamber, said valve having a port therein adapted to be brought into register with the passage in the hub as it is revolved, the parts being arranged so that the said steam inlet valve is opened when the discharge valve of said connecting passage for said scoop and conduit is opened.

2. The combination with a cooking retort, of a cylindrical container having foraminated walls, arranged therein; a shaft; a foraminated conduit arranged centrally of said container about said shaft; a scoop carried by said container; a connecting passage therefor to said conduit; valves arranged at each end of said passage; connections for said valves whereby they are adapted to alternately open and close as the container is revolved; a bearing for said shaft arranged through the wall of said retort, said bearing having a steam inlet passage and a valve chamber therein; a hub for said container projecting into said valve chamber, said hub having a steam passage therein arranged to deliver to said conduit; and a steam inlet valve arranged in said valve chamber, said valve having a port therein adapted to be brought into register with the passage in the hub as it is revolved.

3. The combination with a cooking retort, of a cylindrical container having foraminated walls, arranged therein; a shaft; a foraminated conduit arranged centrally of said container about said shaft; a scoop carried by said container; a connecting passage therefor to said conduit; valves arranged at each end of said passage; connections for said valves whereby they are adapted to alternately open and close as the container is revolved; and connections for delivering steam to said conduit, said connections comprising a valve adapted to be opened when the discharge valve of said connecting passage for said scoop and conduit is opened.

4. The combination with a cooking retort, of a cylindrical container having foraminated walls, arranged therein; a shaft; a foraminated conduit arranged centrally of said container about said shaft; a scoop carried by said container; a connecting passage therefor to said conduit; valves arranged at each end of said passage; connections for said valves whereby they are adapted to alternately open and close as the container is revolved; and connections for delivering steam to said conduit.

5. The combination with a cooking retort, of a cylindrical container having foraminated walls, arranged therein; a shaft; a foraminated conduit arranged centrally of said container about said shaft; a scoop carried by said container; a connecting passage therefor to said conduit; valves arranged at each end of said passage; and connections for said valves whereby they are adapted to alternately open and close as the container is revolved.

6. The combination with a cooking retort, of a cylindrical container having foraminated walls rotatably mounted therein; a foraminated conduit arranged in said container; a scoop carried by said container; a connecting passage therefor to said conduit; valves arranged at each end of said passage; connections for said valves whereby they are adapted to alternately open and close as the container is revolved; and connections for delivering steam to said conduit, said connections comprising a valve adapted to be opened when the delivery valve of said connecting passage for said scoop and conduit is opened.

7. The combination with a cooking retort, of a cylindrical container having foraminated walls rotatably mounted therein; a foraminated conduit arranged in said container; a scoop carried by said container; a connecting passage therefor to said conduit; valves arranged at each end of said passage; connections for said valves whereby they are adapted to alternately open and close as the container is revolved; and connections for delivering steam to said conduit.

8. The combination with a cooking retort, of a cylindrical container having foraminated walls rotatably mounted therein; a foraminated conduit arranged in said container; a scoop carried by said container; a connecting passage therefor to said conduit; valves arranged at each end of said passage; and connections for said valves whereby they are adapted to alternately open and close as the container is revolved.

9. The combination with a cooking retort, of a cylindrical container having foraminated walls rotatably mounted therein; a foraminated conduit arranged in said container; a scoop carried by said container; a valved connection for said scoop to said conduit; and connections for delivering steam to said conduit, said connections comprising a valve adapted to be opened when the delivery valve of said connecting passage for said scoop and conduit is opened.

10. The combination with a cooking retort, of a cylindrical container having foraminated walls rotatably mounted therein; a foraminated conduit arranged in said container; a scoop carried by said container; a valved connection for said scoop to said conduit; and connections for delivering steam to said conduit.

11. The combination with a cooking retort, of a cylindrical container having foraminated walls rotatably mounted therein; a foraminated conduit arranged in said container; a scoop carried by said container; and a valved connection for said scoop to said conduit.

12. The combination with a cooking retort, of a cylindrical container having foraminated walls rotatably mounted therein; a foraminated conduit arranged in said container; a scoop carried by said container connected to deliver to said conduit; and connections for delivering steam to said conduit.

13. The combination with a cooking retort, of a cylindrical container having foraminated walls rotatably mounted therein; a foraminated conduit arranged in said container; and a scoop carried by said container connected to deliver to said conduit.

14. The combination with a cooking retort, of a cylindrical container arranged therein; a foraminated conduit arranged in said container; a shaft; a bearing for said shaft, said bearing having a valve chamber therein; a hub for said container projecting into said valve chamber, said hub having a plurality of steam passages therein arranged to deliver to said conduit; a steam inlet valve arranged in said valve chamber, said valve having a port therein adapted to be brought successively into register with said passages in the hub, as it is revolved; and means for delivering liquid to said conduit, comprising a discharge valve arranged to be opened when said steam inlet valve is opened.

15. The combination with a cooking retort, of a cylindrical container arranged therein; a foraminated conduit arranged in said container; a shaft; a bearing for said shaft, said bearing having a valve chamber therein; a hub for said container projecting into said valve chamber, said hub having a plurality of steam passages therein arranged to deliver to said conduit; and a steam inlet valve arranged in said valve chamber, said valve having a port therein adapted to be brought successively into register with said passages in the hub, as it is revolved.

16. The combination with a cooking retort, of a cylindrical container arranged therein; a foraminated conduit arranged in said container; a shaft; a bearing for said shaft, said bearing having a valve chamber therein; a hub for said container projecting into said valve chamber, said hub having a steam passage therein arranged to deliver to said conduit; a steam inlet valve arranged in said valve chamber, said valve having a port therein adapted to be brought into register with said passage in the hub, as it is revolved; and means for delivering liquid to said conduit, comprising a discharge valve arranged to be opened when said steam inlet valve is opened.

17. The combination with a cooking retort, of a cylindrical container arranged therein; a foraminated conduit arranged in said container; a shaft; a bearing for said shaft, said bearing having a valve chamber therein; a hub for said container projecting into said valve chamber, said hub having a steam passage therein arranged to deliver to said conduit; and a steam inlet valve arranged in said valve chamber, said valve having a port therein adapted to be brought into register with said passage in the hub, as it is revolved.

In witness whereof, I have hereunto set my hand and seal in the presence of two witnesses.

JOSEF C. PRIMS. [L. S.]

Witnesses:
O. L. ALLEN,
GEO. W. LEWIS.